(12) United States Patent
Ueda et al.

(10) Patent No.: US 9,235,895 B2
(45) Date of Patent: Jan. 12, 2016

(54) METHOD FOR ESTIMATING DIRECTION OF PERSON STANDING STILL

(75) Inventors: Taishi Ueda, Tokyo (JP); Ryosuke Nakamura, Tokyo (JP); Azusa Amino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 53 days.

(21) Appl. No.: 14/364,927

(22) PCT Filed: Dec. 13, 2011

(86) PCT No.: PCT/JP2011/078805
§ 371 (c)(1),
(2), (4) Date: Jun. 12, 2014

(87) PCT Pub. No.: WO2013/088517
PCT Pub. Date: Jun. 20, 2013

(65) Prior Publication Data
US 2014/0376780 A1    Dec. 25, 2014

(51) Int. Cl.
*G06T 7/00* (2006.01)
*G06K 9/00* (2006.01)
(Continued)

(52) U.S. Cl.
CPC .............. *G06T 7/0042* (2013.01); *G01B 11/14* (2013.01); *G01P 13/02* (2013.01); *G06K 9/00362* (2013.01); *G06T 2207/10012* (2013.01); *G06T 2207/10024* (2013.01); *G06T 2207/30196* (2013.01); *G06T 2207/30248* (2013.01)

(58) Field of Classification Search
CPC ............. G06K 9/00362; G06T 7/0042; G06T 2207/10012; G06T 2207/10024; G06T 2207/30196; G06T 2207/30248; G01B 11/14; G01P 13/02
See application file for complete search history.

(56) References Cited

U.S. PATENT DOCUMENTS

| 7,006,950 B1 * | 2/2006 | Greiffenhagen et al. ......... 703/2 |
| 7,706,571 B2 * | 4/2010 | Das et al. ...................... 382/103 |

(Continued)

FOREIGN PATENT DOCUMENTS

| JP | 10-269366 A | 10/1998 |
| JP | 2000-207568 A | 7/2000 |

(Continued)

OTHER PUBLICATIONS

Machine translation of KR10-2011-0019948.*

(Continued)

*Primary Examiner* — Katrina Fujita
(74) *Attorney, Agent, or Firm* — Crowell & Moring LLP

(57) ABSTRACT

The invention is directed to detecting a boundary position between a foot and a lower leg of a person in an image acquired by an imaging unit, the boundary position being a substantial boundary part, in a lower limb, between the foot, which is a part from a malleolus to a tip part, and the lower leg; detecting a feature quantity that makes it possible to classify a ground and a part other than the ground in the image; setting, in a peripheral region around the boundary position, a plurality of local regions having positional information and/or direction information relative to the boundary position, and determining whether each of the local regions is the ground or the part other than the ground by using the feature quantity unique to the ground; determining a foot region from the local region determined as the part other than the ground; and estimating a direction of the foot of the person from the local region classified as the foot region and from the information.

7 Claims, 8 Drawing Sheets

(51) Int. Cl.
*G01B 11/14* (2006.01)
*G01P 13/02* (2006.01)

(56) References Cited

U.S. PATENT DOCUMENTS

| | | | | |
|---|---|---|---|---|
| 8,457,357 | B2* | 6/2013 | Foote et al. | 382/103 |
| 8,471,848 | B2* | 6/2013 | Tschesnok | 345/420 |
| 8,503,727 | B2* | 8/2013 | Naito et al. | 382/103 |
| 8,514,236 | B2* | 8/2013 | Kobla et al. | 345/547 |
| 8,712,097 | B2 | 4/2014 | Uchida et al. | |

FOREIGN PATENT DOCUMENTS

| | | | | |
|---|---|---|---|---|
| JP | 2007-229816 A | | 9/2007 | |
| JP | 2010-152873 A | | 7/2010 | |
| KR | 10-2011-0019948 | * | 3/2011 | G06T 7/20 |

OTHER PUBLICATIONS

Khan et al., "Tracking Multiple Occluding People by Localizing on Multiple Scene Planes", 2008, Pattern Analysis and Machine Intelligence, IEEE Transactions on , vol. 31, Iss. 3, 505-519.*
Chen et al., "Accurate self-calibration of two cameras by observations of a moving person on a ground plane", Advanced Video and Signal Based Surveillance, 2007. AVSS 2007. IEEE Conference on, 129-134.*
Krahnstoever et al., "Gaze and body pose estimation from a distance", Advanced Video and Signal-Based Surveillance (AVSS), 2011 8th IEEE International Conference on, Sep. 2011, 11-16.*
International Search Report dated Jan. 17, 2012 with English translation (four (4) pages).

* cited by examiner (1) HORIZONTAL PLANE
FOOT-LOWER LEG POSITION (2) FOOT-LOWER LEG
BOUNDARY POSITION (1) DIGITAL IMAGE G (2) HISTOGRAM IN RGB OF DIGITAL IMAGE G (1) DIGITAL IMAGE G (2) PROJECTIVELY TRANSFORMED IMAGE G'

(3) SELECT DIRECTION REGION (4) DETERMINE TIPTOE DIRECTION

METHOD FOR ESTIMATING DIRECTION OF PERSON STANDING STILL

TECHNICAL FIELD

The present invention relates to a method for estimating a direction of a person standing still.

BACKGROUND ART

It is necessary for an autonomous mobile apparatus to determine a moving direction of a person in order to move forward safely and effectively.

As a background art in the present technical field, there is JP 2007-229816 A (PTL 1). In PTL 1, a method for predicting a course of a pedestrian from a toe image is described. In the method, a pedestrian course model construction unit constructs a course model of a general pedestrian in advance by combining information of a toe image of a specific pedestrian and detected course information of the specific pedestrian, and a pedestrian course model storage unit stores information of the pedestrian course model.

Then, a pedestrian course prediction unit predicts a course of an unspecific pedestrian by collating information of a toe image of the unspecific pedestrian, which image is generated by a pedestrian toe image generation unit, and the information of a pedestrian course model stored in the pedestrian course model storage unit.

As a method to detect a course in construction of a pedestrian course model, it is described to detect a three-dimensional position of a pedestrian serially in certain time intervals and to detect the course of the pedestrian from a temporally change of the three-dimensional position.

CITATION LIST

Patent Literature

PTL 1: JP 2007-229816 A

SUMMARY OF INVENTION

Technical Problem

In PTL 1, a pedestrian course model is constructed from a positional change of a pedestrian in predetermined time intervals. However, there is no positional change in a person who stands still (person standing still), and thus, it is not possible to construct a course model and to estimate a direction. Also, by a method of performing pattern matching with a database which is like a general pedestrian model of PTL 1, it is not possible to estimate a direction when appearance, such as clothes, a physique, or the like, of a person standing still is greatly different from that of a person in the database.

However, in a case where an autonomous mobile apparatus such as a robot passes through an environment crowded with people standing still, it is necessary to estimate a direction in which a person standing still starts walking, in order to prevent the autonomous mobile apparatus from hitting the person or blocking movement of the person even when the person standing still suddenly starts walking. A direction in which a person standing still starts walking often matches a direction of a foot. The person standing still starts to move to a side or a backward of the foot for only about one or two steps. Thus, it is suitable to detect a direction in which a person starts to move by a direction of a foot.

A purpose of the present invention is to provide a method for estimating a direction of a person standing still, which method makes it possible to perform a safe movement control by estimating a direction, in which a person standing still starts to walk, from a momentary single still image of the person standing still and by moving through a region in which the person is not likely to be hit.

Solution to Problem

To achieve the above purpose, the present invention includes the steps of: detecting a boundary position between a foot and a lower leg of a person in an image acquired by an imaging unit, the boundary position being a substantial boundary part, in a lower limb, between the foot, which is a part from a malleolus to a tip part, and the lower leg; detecting a feature quantity which makes it possible to classify a ground and a part other than the ground in the image; setting, in a peripheral region around the boundary position, a plurality of local regions having positional information and/or direction information relative to the boundary position, and determining whether each of the local regions is the ground or the part other than the ground by using the feature quantity unique to the ground; determining a foot region from the local region determined as the part other than the ground; and estimating a direction of the foot of the person from the local region classified as the foot region and from the positional information.

Also, to achieve the above purpose, preferably in the present invention, the boundary position between the foot and the lower leg is specified by using a distance sensor.

Also, to achieve the above purpose, preferably in the present invention, the distance sensor is parallel to the ground and measures a plane surface at a height of the substantial boundary part, in the lower limb of the person, between the foot and the lower leg.

Also, to achieve the above purpose, preferably in the present invention, the feature quantity of the ground is calculated based on a histogram of data in each pixel in the image.

Also, to achieve the above purpose, preferably in the present invention, each of the local regions, which is set in the peripheral region around the boundary position between the foot and the lower leg, is a sector with the boundary position as a center.

Also, to achieve the above purpose, preferably in the present invention, when a distance between paired foot regions is smaller than a predetermined value and a difference in a feature quantity between the paired foot regions is equal to or smaller than a predetermined value, the paired foot regions are determined as the foot regions of the same person.

Also, to achieve the above purpose, preferably in the present invention, a direction of the person is estimated based on the information held in the local region which is included in the foot region of the same person.

Advantageous Effects of Invention

According to the present invention, it is possible to provide a method for estimating a direction of a person standing still, which method makes it possible to perform a safe movement control by estimating a direction, in which a person standing still starts to walk, from a momentary single still image of the person standing still and by moving through a region in which the person is not likely to be hit.

DESCRIPTION OF EMBODIMENTS

In the following, embodiments will be described with reference to the drawings.

First Embodiment

Figure 2:
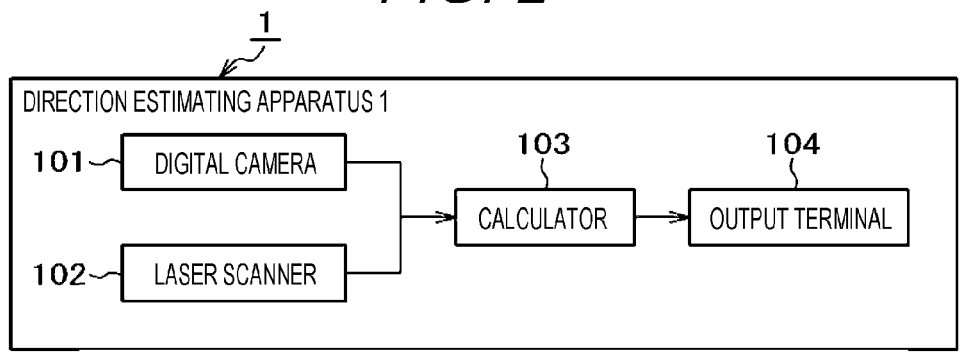
FIG. 2 is a schematic configuration view illustrating a direction estimating apparatus according to the embodiment of the present invention.

FIG. 2 is a view illustrating a configuration example of a direction estimating apparatus 1 in which the present embodiment is mounted.

FIGS. 3(a) to 3(c) are appearance views of the direction estimating apparatus 1.

In FIG. 2, the direction estimating apparatus 1 includes a digital camera 101, a laser scanner 102, a calculator 103, and an output terminal 104. The digital camera 101 acquires a digital image G and transmits the acquired digital image G to the calculator 103. The laser scanner 102 transmits a measurement value to the calculator 103. The calculator 103 estimates a direction of a person 201 based on information acquired from the digital camera 101 and the laser scanner 102, and outputs a result as an electric signal to the output terminal 104.

In FIGS. 3(a) to 3(c), the digital camera 101 is provided to an upper part of a direction estimating apparatus 2. As illustrated in FIG. 3(b), the digital camera 105 is attached in an inclined manner to photograph, from above, an object to be photographed. The laser scanner 102 is provided to a lower part of the direction estimating apparatus 1. The calculator 103 is placed around a central part of the direction estimating apparatus 2 and connected to the output terminal 104 behind the calculator 103.

With reference to the flowchart in FIG. 1, a method for estimating a direction of a person standing still according to the present embodiment will be described.

Figure 1:
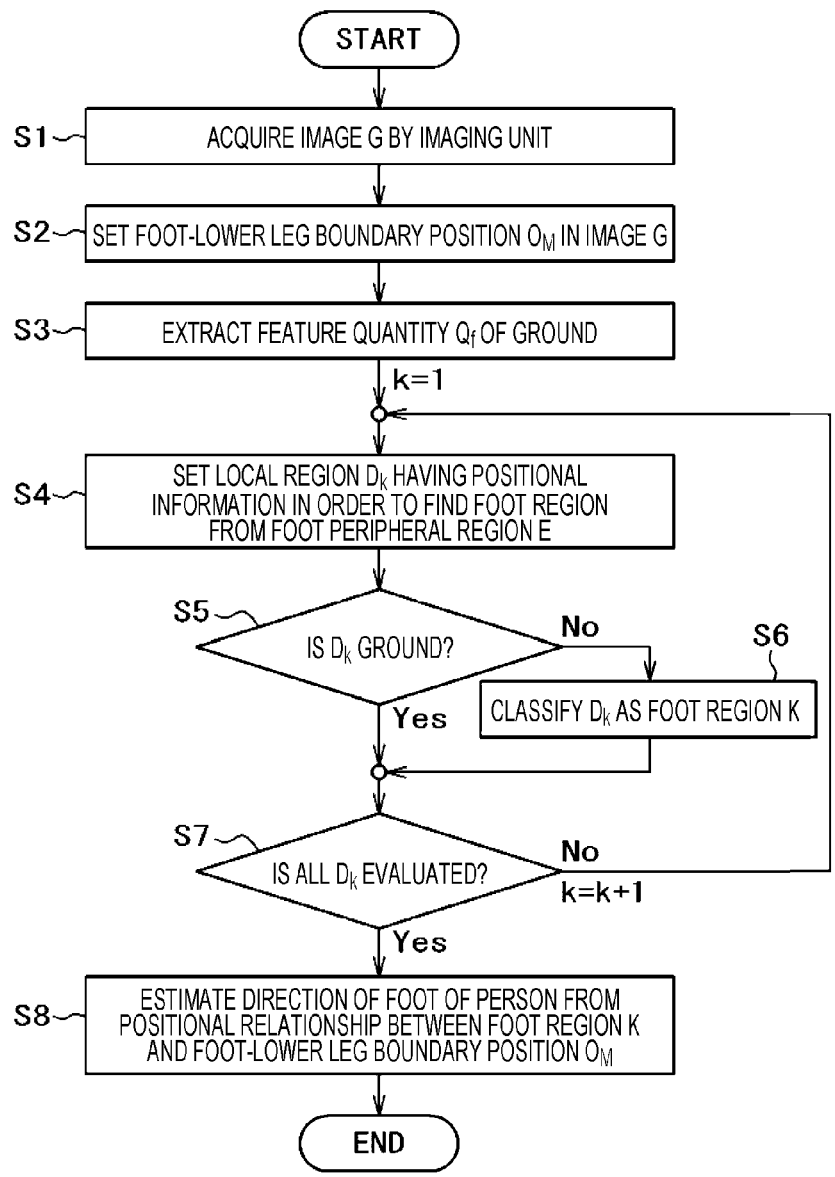
FIG. 1 is a flowchart for describing a step of estimating a direction according to an embodiment of the present invention.

In S1 in FIG. 1, a digital image G around a foot of the person 201 is acquired from the digital camera 101. Each pixel in the digital image G includes, as numerical data C, color information such as RGB intensity. By using an infrared camera, a stereo camera, a three-dimensional distance sensor, or the like as an imaging unit, temperature information, distance information, or the like can be suitably used. In the present embodiment, the RGB intensity is used as the numerical data C.

Figure 4:
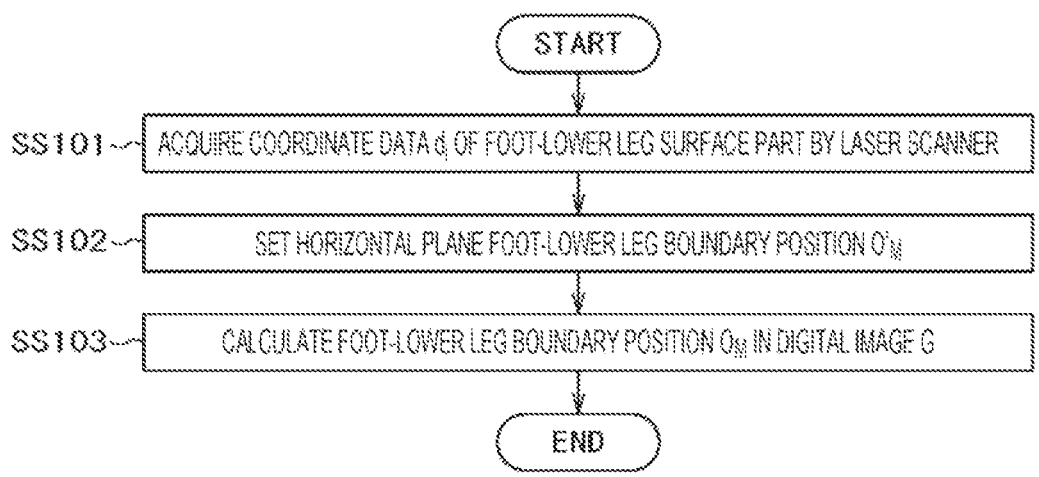
FIG. 4 is a flowchart for describing a method for estimating a foot-lower leg boundary position according to the embodiment of the present invention.

In S2, a position indicating a boundary part between a foot and a lower leg (foot-lower leg boundary position $O_M$), in the image G, of a person standing still in the image G is set. Processing in S2 is illustrated in a flowchart in FIG. 4.

In SS101, the laser scanner 102 scans a plane surface F302 parallel to a ground T301, which is illustrated in FIG. 3(c), and a coordinate data group of a surface of the boundary part between the foot and the lower leg of the person 201 is acquired.

As illustrated in FIG. 3(c), the height of the plane surface F302 is around 15 to 30 cm, and the height around an ankle of a person is suitable thereto. In SS102, a representative position of a cross sectional surface of the boundary between the foot and the lower leg on the plane surface F302 (horizontal plane foot-lower leg boundary position $O'_M$) is set from the coordinate data group acquired in SS101. As a method for the setting, there is a following method.

Figure 5:
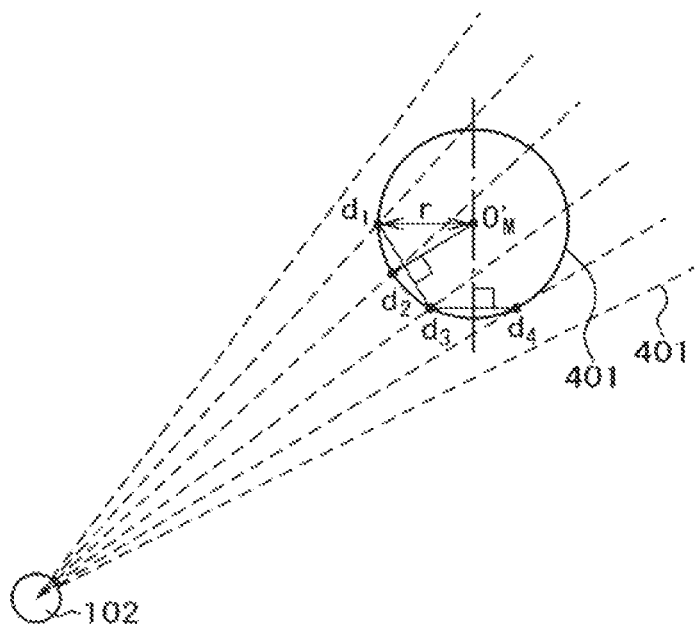
FIG. 5 is a view for describing a method for estimating a horizontal plane foot-lower leg boundary position according to the embodiment of the present invention.

First, in the coordinate data group acquired by the laser scanner 102, coordinate data points are separated into groups by regarding adjacent coordinate data points within a range of a certain distance as coordinate data points of the same object. Then, as illustrated in FIG. 5, in a case where a shape of the cross sectional surface of the boundary between the foot and the lower leg is regarded as a circle, a central position of the cross sectional surface of the boundary is set as the horizontal plane foot-lower leg boundary position $O'_M$.

For example, in a case where a coordinate data point group which belongs to a group k includes $\{d_1, d_2, d_3, \text{and } d_4\}$, three coordinate data points $\{d_i, d_j, \text{and } d_k\}$ (i, j, and k are arbitrary natural numbers) are selected arbitrarily, and an intersection of perpendicular bisectors, each of which is formed by arbitrary two points among $\{d_i, d_j, \text{and } d_k\}$, is set as the horizontal plane foot-lower leg boundary position $O'_M$. In SS103 in FIG. 4, the horizontal plane foot-lower leg boundary position $O'_M$ acquired in SS102 is projectively transformed, and the foot-lower leg boundary position $O_M$ in the digital image G acquired in S1 is calculated.

Figure 6:
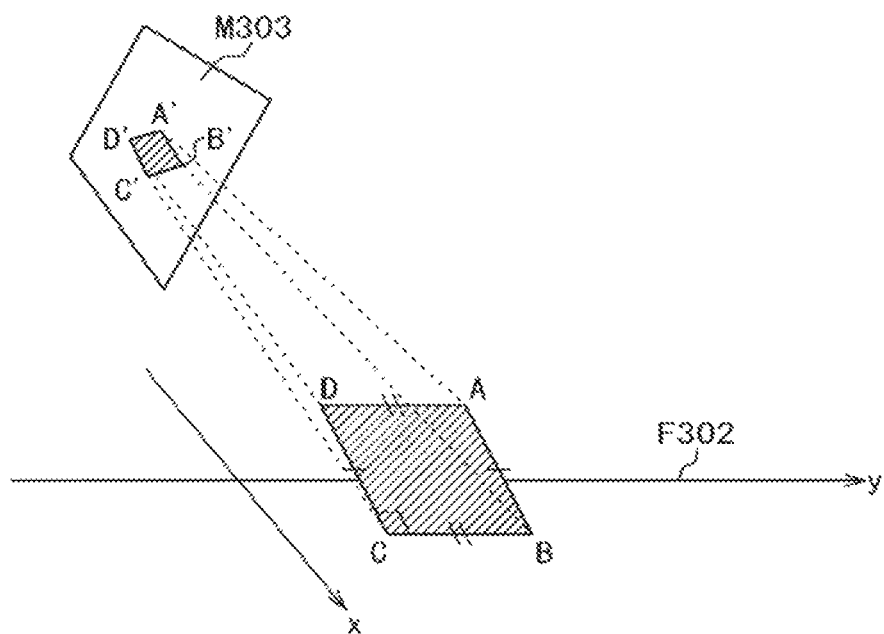
FIG. 6 is a view for describing an example of a method for calculating projection according to the embodiment of the present invention.

As illustrated in FIG. 6, when an imaging surface of a camera is regarded as a plane surface M303, an arbitrary point X (x, y) on the plane surface F302 can be projectively transformed into a point X' (x', y') on the plane surface M303 which satisfy an equation 1.

[Mathematical Formula 1]

$$\begin{cases} x' = \dfrac{a_1 x + b_1 y + c_1}{a_0 x + b_0 y + c_0} \\ y' = \dfrac{a_2 x + b_2 y + c_2}{a_0 x + b_0 y + c_0} \end{cases} \quad \text{equation 1}$$

By determining real coefficients $a_0, b_0, c_0, a_1, b_1, c_1, a_2, b_2,$ and $c_2$, a mapping relationship between the plane surface F302 and the plane surface M303 is derived. By reducing a denominator and a numerator on the right-hand side, it can be regarded that the equation 1 includes eight independent variables.

Figure 7:
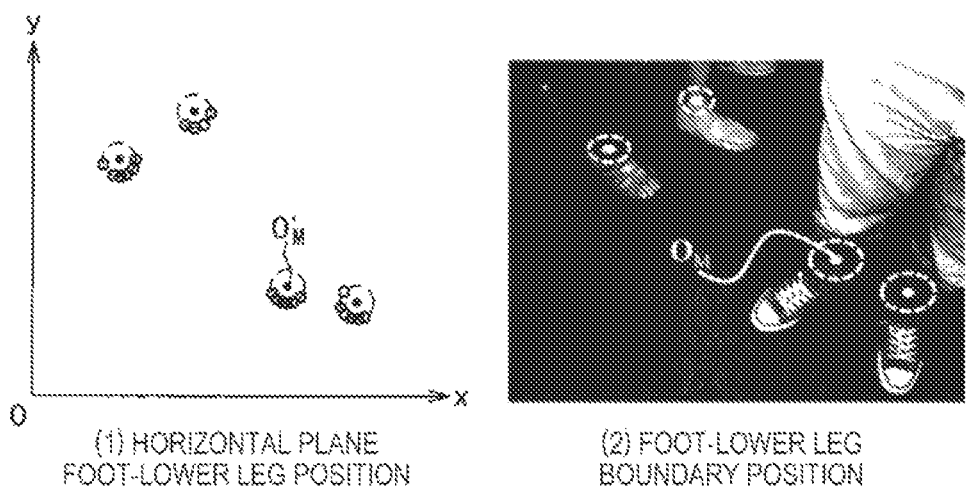
FIGS. 7(1) and 7(2) are views for describing an estimation result of the foot-lower leg boundary position according to the embodiment of the present invention.

Thus, by measuring four vertexes of a tetragon A'B'C'D', which is a rectangle ABCD on the plane surface F302 imaged onto the plane surface M303 as illustrated in FIG. 6, coordinates of four vertexes of the rectangle ABCD being already known, and by solving simultaneous equations by substituting a coordinate of each of the vertexes ABCD and A'B'C'D' into the equation 1, all coefficients can be calculated. By calculating a coefficient before activating an apparatus, projective transformation of an arbitrary point on the plane surface F302 onto the plane surface M303 is calculated. Thus, as illustrated in FIGS. 7(1) and 7(2), it is possible to projectively transform the horizontal plane foot-lower leg boundary position $O'_M$ calculated in SS102, and to calculate the foot-lower leg boundary position $O_M$ in the digital image G.

In S3 in FIG. 1, a feature quantity $Q_f$ unique to a ground is extracted from the digital image G. A method for extracting the feature quantity will be described with reference to FIGS. 8(1) and 8(2).

Figure 8:
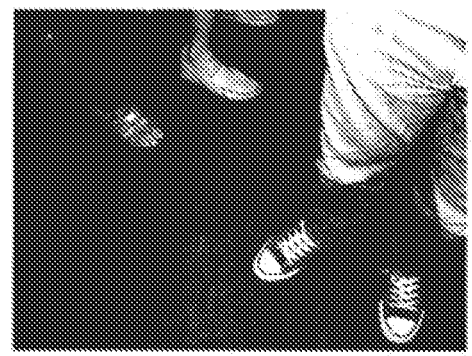
FIG. 8(1) is a view and FIG. 8(2) is a chart, which are for describing a method for extracting a feature quantity of a ground according to the embodiment of the present invention.
Figure 8:
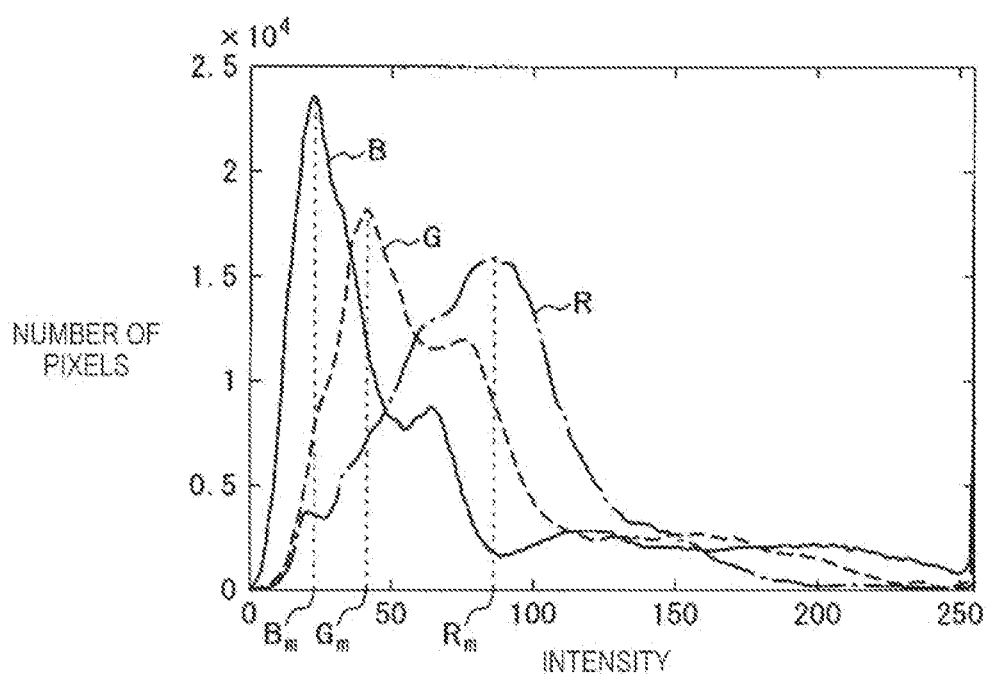

Each pixel in the digital image G in FIG. 8(1) includes RGB intensity as a numerical value. When calculated, a histogram of the RGB intensity of the digital image G resembles FIG. 8(2). Since the ground occupies a great part of the digital image G, a color in the vicinity of each of the peaks $R_m$, $G_m$, and $B_m$ of RGB in the histogram in FIG. 8(2), is estimated as a color of the ground, and RGB intensity which satisfies an equation 2 is set as the feature quantity $Q_f$ unique to the ground.

[Mathematical Formula 2]

$$C_f = \{C | R_m - \Delta R_m < R < R_m + \Delta R_f$$

$$\cap G_m - \Delta G_l < G < G_m + \Delta G_f$$

$$\cap B_m - \Delta B_l < B < B_m + \Delta B_f\} \quad \text{equation 2}$$

$\Delta R_l$, $\Delta R_r$, $\Delta G_l$, $\Delta G_r$, $\Delta B_l$, and $\Delta B_r$ are arbitrary real numbers and are set suitably according to a condition of the ground. Note that when $Q_f$ is constant all the time, $Q_f$ may be extracted in advance and may be stored inside or outside the apparatus.

Figure 9:
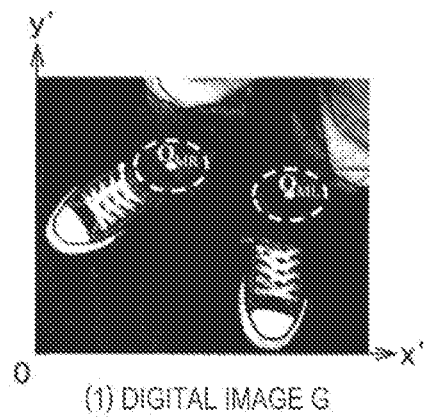
FIGS. 9(1) to 9(4) are views for describing a method for estimating a foot direction of a person according to the embodiment of the present invention.
Figure 9:
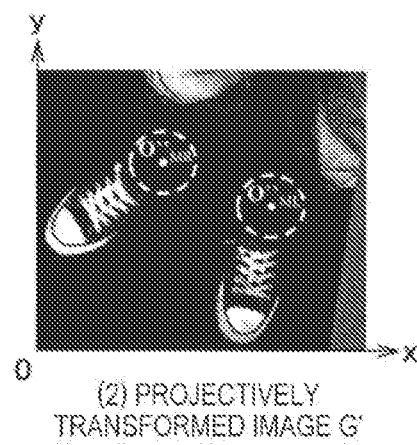
Figure 9:
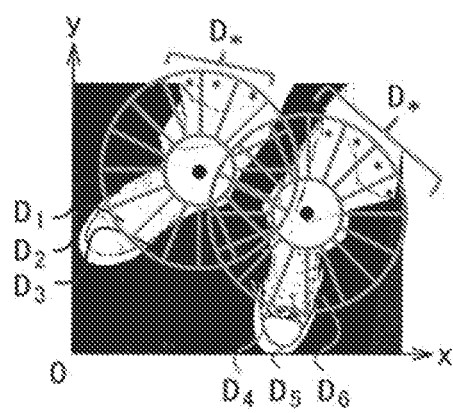
Figure 9:
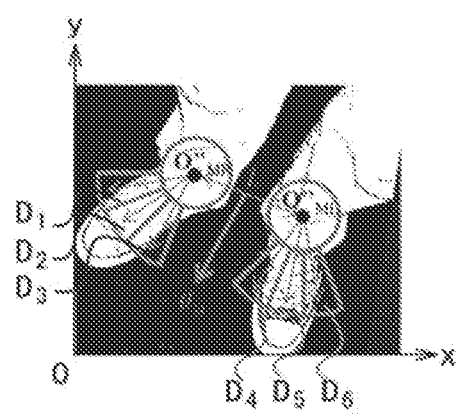

In S4 in FIG. 1, a local region $D_k$ is set in order to find a region including a foot (foot region) from a peripheral region of the foot (foot peripheral region E) in the digital image G. For example, as illustrated in FIG. 9(2), it is assumed that foot-lower leg boundary positions $O_{MR}$ and $O_{ML}$ in right and left lower limbs are set by S2. First, the digital image G is projectively transformed, in a similar manner to S2, onto a surface parallel to the ground, and a state of the foot viewed from a vertical direction toward the ground is simulated. Here, projectively transformed image is regarded as G', and projection positions of $O_{MR}$ and $O_{ML}$ are regarded as $O''_{MR}$ and $O''_{ML}$, respectively. Next, a region, which is sandwiched between a circle having a radius of $r_{min}$ and a circle having a radius of $r_{max}$ with a foot-lower leg boundary position $O''_{MR}$ or $O''_{ML}$ after the projective transformation as a center, is regarded as the foot peripheral region E. Then, from the foot peripheral region E, a plurality of local regions $D_k$ is selected. Each of the local regions $D_k$ is set, in a fan shape as illustrated in FIG. 9(3), to include information of a position or a direction relative to $O''_{MR}$ or $O''_{ML}$.

Figure 10:
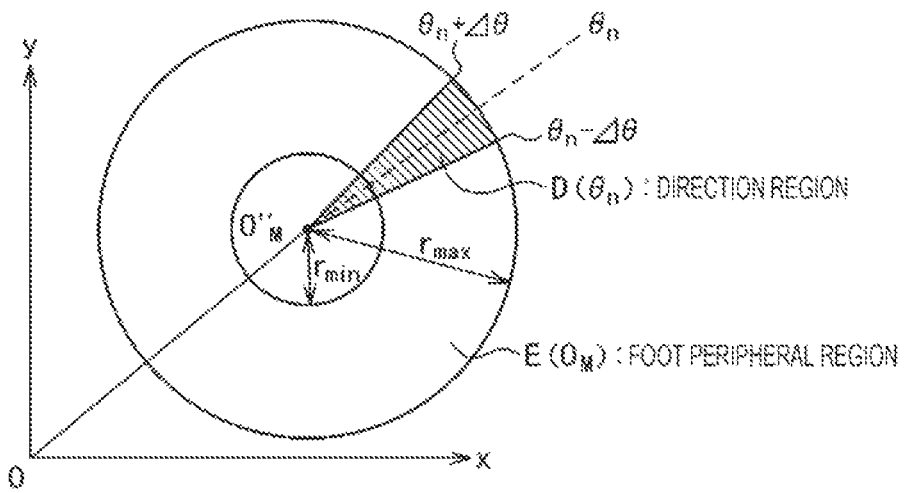
FIG. 10 is a view for describing a local region according to the embodiment of the present invention.

In the present embodiment, as illustrated in FIG. 10 and expressed in an equation 3, $D_k$ is set according to an arbitrary direction $\theta_k$ with $O''_M$ as a center.

[Mathematical Formula 3]

$$D(\theta_n) = O_M + se \quad \text{equation 3}$$

however, $$e = \begin{bmatrix} \cos\theta \\ \sin\theta \end{bmatrix},$$

$$\theta_n - \Delta\theta < \theta < \theta_n - \Delta\theta,$$

$$r_{min} < s < r_{max}$$

$r_{min}$, $r_{max}$, $\Delta\theta$, and the number of $D_k$ are set suitably according to an environment.

In S5 in FIG. 1, each of the local regions $D_k$ is evaluated and determined whether it is the ground. Among the pixels in each of the local regions $D_k$, the number of pixels which satisfy a condition of the feature quantity $Q_f$ is regarded as an evaluation value of the local region $D_k$. It can be determined that the higher the evaluation value is, the more ground the region has. When the evaluation value is larger than a predetermined value, $D_k$ is determined as the ground. When the evaluation value is smaller than a predetermined place, $D_k$ is determined as a part of the foot, and a step goes to S6 and $D_k$ is classified as a foot region K $\{D_q\}$ (q is natural number). Note that in the present embodiment, the foot peripheral region E is regarded as a circle, and the local region D is regarded as a sector. However, a polygon, an ellipse, or the like can be selected suitably.

In S7 in FIG. 1, it is checked whether all $D_k$ is evaluated. When there is a local region $D_k$ which is not evaluated yet, a step goes back to S4 and $D_k$ which is not evaluated yet is evaluated.

In S8 in FIG. 1, a foot direction $\theta_M$ of an object M is estimated from a positional relationship between the local region $D_q$ classified as the foot region K and the foot-lower leg boundary position $O_M$.

Figure 11:
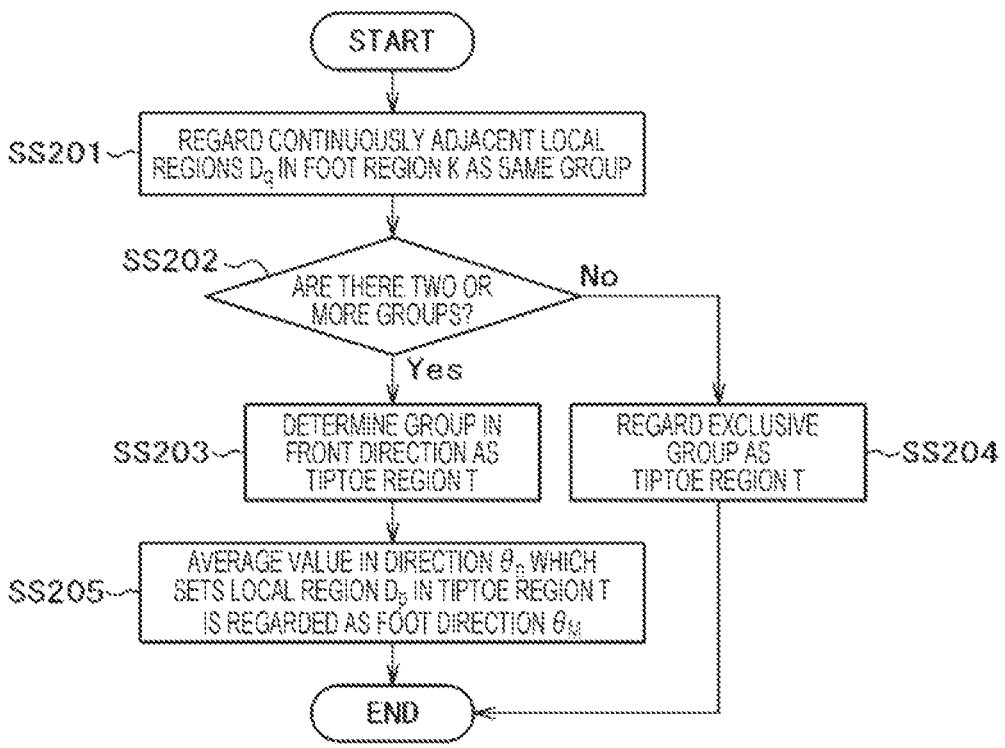
FIG. 11 is a flowchart for describing processing for specifying a tiptoe region in the embodiment of the present invention.

For example, in a case of FIG. 9(3), at a time point of S8, $D_p$ (p=1, 2, 3 . . . , 6) and D* are classified as the foot region K. $D_p$ is a region including a tiptoe (tiptoe region T), and D* is a region including a lower leg (lower leg region L). A foot direction of a person is a direction of a tiptoe with the foot-lower leg boundary position $O_M$ as a basis, and thus, it is possible to identify a foot direction from a position of the tiptoe region T. An example of separation of the tiptoe region T and the lower leg region L will be described with reference to a flowchart in FIG. 11.

In SS201, grouping is performed and local regions $D_q$, which belong to the foot region K and are continuously adjacent, are separated into the same group. In SS202, the number of groups is checked, and when there are two or more groups, a step goes to SS203. A group in a direction close to a front direction (−y direction in FIG. 9(3)) is determined as the tiptoe region T. When there is only one group, a step goes to SS204, and the group is determined as the tiptoe region T. In SS205, an average value in a direction $\theta_p$ which sets the local region $D_p$ included in the tiptoe region T is regarded as the foot direction $\theta_M$.

For example, in a case of FIG. 9(4), a direction which sets a local region $D_{Ln}$ having the foot-lower leg boundary position $O''_{ML}$ as a basis is regarded as $\theta_{Ln}$, and an average value in $\theta_{Ln}$ is regarded as a foot direction $\theta_{ML}$ on $O''_{ML}$. A foot direction $\theta_{MR}$ on the foot-lower leg boundary position $O''_{MR}$ is calculated in a similar manner.

All the foot directions estimated in such a manner are output from the output terminal 104. Also, in S8, when a distance between $O''_{ML}$ and $O''_{MR}$ is smaller than a certain value L and predetermined feature quantities $Q_M$ of the tiptoe regions $D_{Ln}$ and $D_{Rn}$, which respectively have $O''_{MR}$ and $O''_{ML}$ as centers, are close to each other, the tiptoe regions $D_{Ln}$ and $D_{Rn}$ are determined as those of the same person and the average value in $\theta_{ML}$ and $\theta_{MR}$ may be estimated as the foot direction $\theta_M$ of the person 201. As the feature quantity $Q_M$, a feature point coordinate or the like by an RGB color histogram or edge detection is used suitably. Thus, even when the image G includes a plurality of people, it is possible to estimate a direction of each person independently.

In such a manner above, it becomes possible to estimate a foot direction of the person 201 from a single image without using a database.

Second Embodiment

In the present embodiment, an example of using a distance image will be described.

Figure 12:
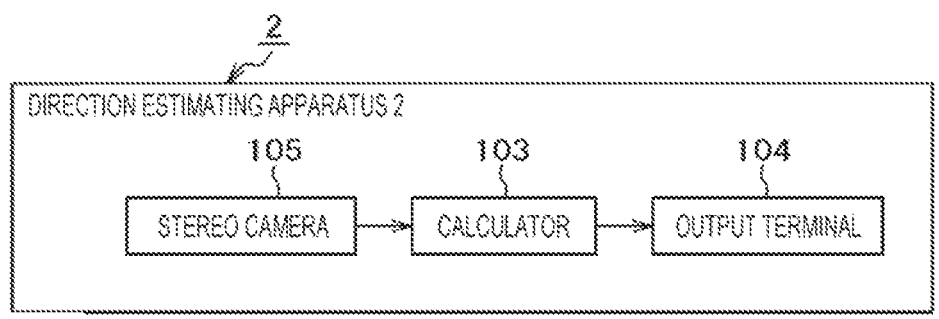
FIG. 12 is a configuration view illustrating a direction estimating apparatus according to a different embodiment of the present invention.
Figure 13:
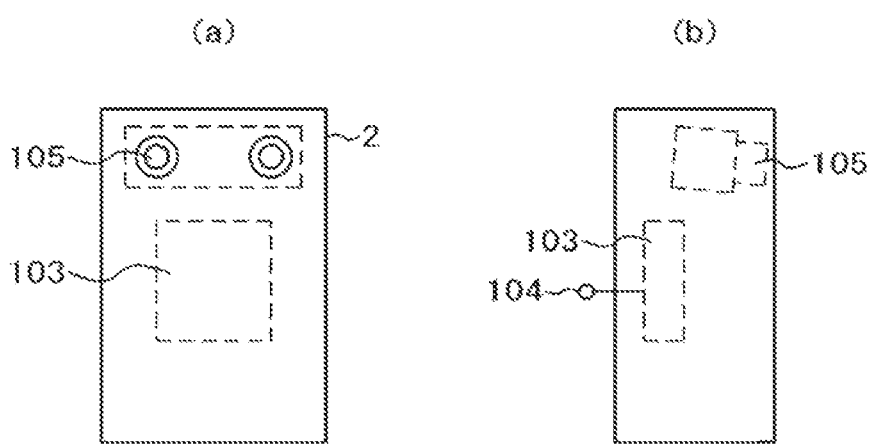
FIGS. 13(a) and 13(b) are appearance views illustrating the direction estimating apparatus according to the different embodiment of the present invention.

In FIG. 12, a direction estimating apparatus 2 for a person standing still according to the second embodiment is illustrated. In FIGS. 13(a) and 13(b), appearance views of the direction estimating apparatus 2 are illustrated.

Figure 3:
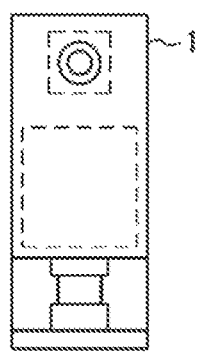
FIGS. 3(a) to 3(c) are schematic appearance views illustrating the direction estimating apparatus according to the embodiment of the present invention.
Figure 3:
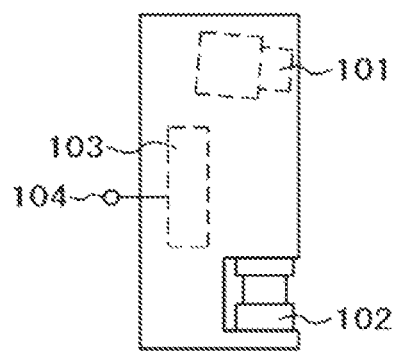
Figure 3:
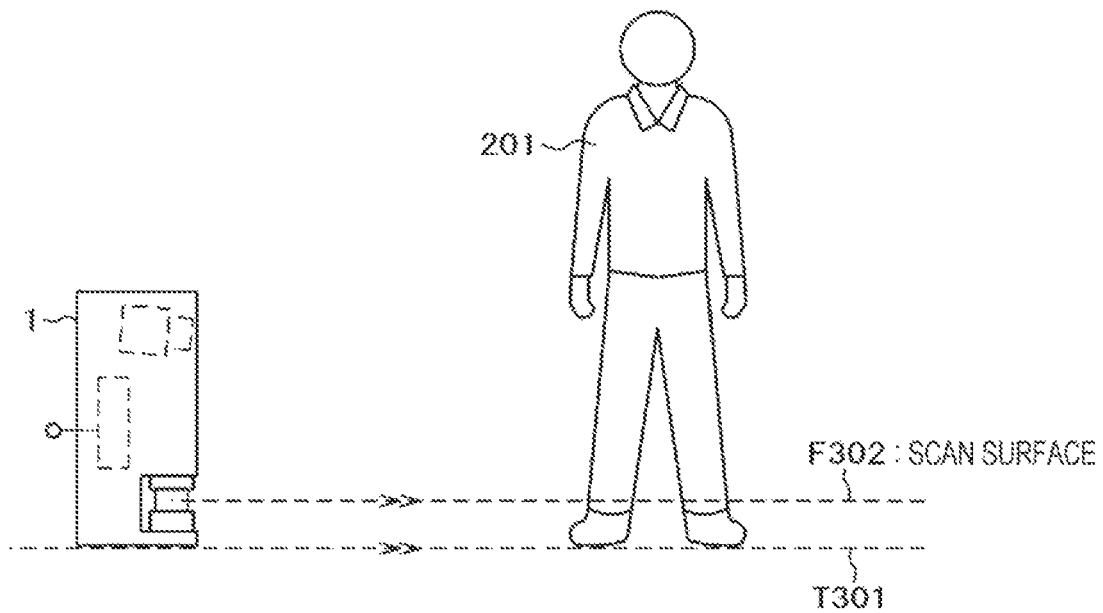

In the direction estimating apparatus 2 in FIG. 12, description of a part having the same function with the configuration having the same assigned signs and are illustrated in FIG. 2 and FIG. 3 which have been already described is omitted. The direction estimating apparatus 2 illustrated in FIG. 12 includes a stereo camera 105 as an imaging unit, and two digital images in which an object to be photographed is viewed from different positions are transmitted to a calculator 103. The calculator 103 calculates a distance, with a ground T301 as a basis, of an object in the images from the two digital images, and generates a distance image $G_{3D}$. Then, the calculator 103 estimates a direction of a person 201 by using distance information as numerical data C included in each pixel.

In FIGS. 13(a) and 13(b), the stereo camera 105 is provided to an upper part of the direction estimating apparatus 2 and photographs a stereo image with two lenses. As illustrated in FIG. 13(b), the stereo camera 105 is attached in an inclined manner to photograph, from above, an object to be photographed. The calculator 103 is placed around a central part of the direction estimating apparatus 2 and connected to the output terminal 104 behind the calculator 103.

A flow of processing in the second embodiment will be described with reference to the flowchart in FIG. 1. However, S4 to S8 are the same with S4 to S8 of the first embodiment which has been described already, and thus, description thereof is omitted.

In S1, two digital images $G_1$ and $G_2$ are acquired from a stereo camera 104.

In S2, the distance image $G_{3D}$ is generated from the digital images $G_1$ and $G_2$. The generation of the distance image $G_{3D}$ is performed, for example, by the following method. First, edge extraction or the like is performed on a minute region $a_{1n}$ in the digital image $G_1$, and a feature quantity $s_{1n}$ is given thereto. Next, a minute region $a_{2n}$ having a feature quantity $s_{2n}$ which is the same with the feature quantity $s_{1n}$ of $a_{1n}$ is searched from $G_2$. Then, a distance z, to a minute region $a_{kn}$ (k=1, 2) is calculated by an equation 4, and is regarded as a distance of a minim region $a_{1n}$.

[Mathematical Formula 4]

$$z_n = \frac{f \cdot h}{g_{1n} - g_{2n}} \quad \text{equation 4}$$

Here, $g_{kn}$ (k=1, 2) is a barycentric position of $a_{kn}$, f is a focal distance of a camera, and h is a space between two cameras. By performing the calculation on the whole digital image $G_1$, the distance image $G'_{3D}$ from the camera can be obtained. The distance image $G_{3D}$ with the ground T301 basis can be easily acquired from $G'_{3D}$.

In S3, a foot-lower leg boundary position is specified. In the distance image $G_{3D}$ acquired in S2, a pixel, in which a distance C is larger than the height from the ground T301 to an ankle of a person and the distance C is smaller than a predetermined height, is recognized as the foot-lower leg boundary position of the person 201, whereby a foot-lower leg boundary position in the image $G_1$ or $G_2$ can be specified immediately.

In S4, a feature quantity $Q_f$ of the ground is extracted. The feature quantity $Q_f$ of the ground indicates that a distance is in the vicinity of zero and is expressed in an equation 5.

[Mathematical Formula 5]

$$C_f = \{C | |C| < \epsilon\} \quad \text{equation 5}$$

$\epsilon$ is an arbitrary real number and is set suitably according to a condition of the ground. After S4, processing similar to that of the first embodiment is performed on the image $G_1$ or $G_2$, and thus, a foot direction of a person can be estimated.

Third Embodiment

In the first embodiment, when a plurality of colors is included in the ground, there is a plurality of peaks in the histogram. In such a case, a color in the vicinity of each peak may be regarded as the feature quantity of the ground.

Fourth Embodiment

In the first, second, and third embodiments, in a case where the feature quantity of the ground varies depending on a position of each person, it is possible to correspond to the case by acquiring a feature quantity of a region not including a foot of each person from a local image around the foot of each person.

REFERENCE SIGNS LIST

1 direction estimating apparatus of first embodiment
2 direction estimating apparatus of second embodiment
101 digital camera
102 laser scanner
103 calculator
104 output terminal
105 stereo camera
201 object person
T301 ground on which object person actually stands
F302 scan surface of laser scanner
M303 imaging surface of digital camera
G digital image
C feature quantity of image
$Q_f$ feature quantity of foot contact surface
$O_M$ foot-lower leg boundary position of person
D local region
E foot peripheral region
K foot region
$\theta$ direction

The invention claimed is:

1. A method for estimating a direction of a person standing still, comprising the steps of:
   detecting a boundary position between a foot and a lower leg of a person in an image acquired by an imaging unit, the boundary position being a substantial boundary part, in a lower limb, between the foot, which is a part from a malleolus to a tip part, and the lower leg;
   detecting a feature quantity which makes it possible to classify a ground and a part other than the ground in the image;
   setting, in a peripheral region around the boundary position, a plurality of local regions having positional information and/or direction information relative to the boundary position, and determining whether each of the local regions is the ground or the part other than the ground by using the feature quantity unique to the ground;
   determining a foot region from the local region determined as the part other than the ground; and
   estimating a direction of the foot of the person from the local region classified as the foot region and from the information.

2. The method for estimating a direction of a person standing still according to claim 1, wherein the boundary position between the foot and the lower leg is specified by using a distance sensor.

3. The method for estimating a direction of a person standing still according to claim 2, wherein the distance sensor is parallel to the ground and measures a plane surface at a height of the substantial boundary part, in the lower limb of the person, between the foot and the lower leg.

4. The method for estimating a direction of a person standing still according to claim 1, wherein the feature quantity of the ground is calculated based on a histogram of data in each pixel in the image.

5. The method for estimating a direction of a person standing still according to claim 1, wherein each of the local regions, which is set in the peripheral region around the boundary position between the foot and the lower leg, is a sector with the boundary position as a center.

6. The method for estimating a direction of a person standing still according to claim 1, wherein when a distance between paired foot regions is smaller than a predetermined value and a difference in a feature quantity between the paired foot regions is equal to or smaller than a predetermined value, the paired foot regions are determined as the foot regions of the same person.

7. The method for estimating a direction of a person standing still according to claim 6, wherein a direction of the person is estimated based on the information held in the local region which is included in the foot region of the same person.

* * * * *